(12) United States Patent
Shiozawa et al.

(10) Patent No.: US 9,653,108 B2
(45) Date of Patent: May 16, 2017

(54) OPTICAL RECORDING DEVICE, OPTICAL RECORDING METHOD, AND OPTICAL RECORDING MEDIUM

(75) Inventors: Manabu Shiozawa, Tokyo (JP); Koichi Watanabe, Tokyo (JP); Takao Watanabe, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 54 days.

(21) Appl. No.: 14/428,154

(22) PCT Filed: Sep. 14, 2012

(86) PCT No.: PCT/JP2012/073571
§ 371 (c)(1),
(2), (4) Date: Mar. 13, 2015

(87) PCT Pub. No.: WO2014/041676
PCT Pub. Date: Mar. 20, 2014

(65) Prior Publication Data
US 2015/0255106 A1    Sep. 10, 2015

(51) Int. Cl.
*G03H 1/10* (2006.01)
*G03H 1/02* (2006.01)
(Continued)

(52) U.S. Cl.
CPC .... *G11B 7/1267* (2013.01); *G11B 2007/0013* (2013.01)

(58) Field of Classification Search
CPC .... G03H 1/02; G03H 1/04; G03H 2001/0212; G11B 7/24044; G11B 7/0065;
(Continued)

(56) References Cited

U.S. PATENT DOCUMENTS 3,474,457 A * 10/1969 Becker ............... B23K 26/0823
250/316.1
5,694,249 A    12/1997 Misawa
(Continued)

FOREIGN PATENT DOCUMENTS

JP    2001-283443 A    10/2001
JP    2007-035237 A    2/2007
(Continued)

OTHER PUBLICATIONS

E.N. Glezer, et al., "Three-dimensional optical storage inside transparent materials", Opt. Lett., Dec. 15, 1996, vol. 21, No. 24, pp. 2023-2025.
(Continued)

*Primary Examiner* — Jade R Chwasz
(74) *Attorney, Agent, or Firm* — Miles & Stockbridge P.C.

(57) ABSTRACT

When recording is performed by focusing a short pulse laser on an inside of a transparent medium such as quartz glass, and forming a minute deformed region in which the refractive index is different from that of surroundings thereof, it is difficult to ensure a recording quality. Therefore, a recorded dot length in a depth direction is monitored 111 and a power of the laser light is adjusted based on the monitored recorded dot length, or a difference between a focus position where a region of the recorded dots appears brighter than the surroundings and a focus position where the region of the recorded dots appears darker than the surroundings is measured and the power of the laser light is adjusted based on the difference.

12 Claims, 11 Drawing Sheets (51) Int. Cl.
*G11B 7/1267* (2012.01)
*G11B 7/00* (2006.01)

(58) Field of Classification Search
CPC ........ G11B 2007/0013; G11B 7/00736; G11B 7/00781; G11B 7/0938; G11B 7/1267; G11B 7/1275
USPC .................................................. 359/10, 3, 27
See application file for complete search history.

(56) References Cited

U.S. PATENT DOCUMENTS

| | | |
|---|---|---|
| 5,761,111 A | 6/1998 | Glezer |
| 5,793,723 A * | 8/1998 | Okuyama ............... G11B 7/005 369/116 |
| 2002/0012301 A1 | 1/2002 | Kanno et al. |
| 2006/0291352 A1 | 12/2006 | Murakami et al. |
| 2008/0205257 A1 | 8/2008 | Yamatsu et al. |
| 2009/0046565 A1 * | 2/2009 | Yuzurihara .......... G11B 7/1267 369/116 |
| 2011/0107134 A1 | 5/2011 | Ito et al. |

FOREIGN PATENT DOCUMENTS

| | | |
|---|---|---|
| JP | 2008-135144 A | 6/2008 |
| WO | WO 2010/103770 A1 | 9/2010 |

OTHER PUBLICATIONS

M. Sakakura, et al., "Improved phase hologram design for generating symmetric light spots and its application for laser writing of waveguides", Opt. Lett., Apr. 1, 2011, vol. 36, No. 7, pp. 1065-1067.
Hiroaki Misawa, "Takoshi Kyushu ni yoru Glass Hikari Memory", O plus E, Sep. 1998, pp. 1028-1032.
Hikari Oyo Gijutsu, Zairyo Jiten, Kabushiki Kaisha Sangyo Gijutsu Service Center, Apr. 26, 2006, pp. 563-566.

* cited by examiner

OPTICAL RECORDING DEVICE, OPTICAL RECORDING METHOD, AND OPTICAL RECORDING MEDIUM

TECHNICAL FIELD

The present invention relates to a device and method for recording information in a medium using light, and an information recording medium.

BACKGROUND ART

It is known that, when a short pulse laser is focused on an inside a transparent medium such as quartz glass, a minute deformed region is formed, in which the refractive index is different from that of surroundings thereof. Forming a plurality of such minute deformed regions inside the medium in three-dimensions and using it for recording information, has been studied.

In Patent Literature 1 and 2, and Non-patent Literature 1 described below, a three-dimensional memory is disclosed, in which a recording mark of which the refractive index is different from that of the surrounding glass is formed locally on a glass. The mechanism in which the local deformation is formed by a short pulse laser is disclosed in Non-patent Literature 2, for example.

CITATION LIST

Patent Literature

PTL 1: U.S. Pat. No. 5,694,249
PTL 2: U.S. Pat. No. 5,761,111

Non Patent Literature

NPL 1: E. N. Glezer, et. al., "Three-dimensional optical storage inside transparent materials", Opt. Lett., Vol. 21, No. 24, pp. 2023-2025 (1996)
NPL 2: M. Sakakura, et. al., "Improved phase hologram design for generating symmetric light spots and its application for laser writing of waveguides", Opt. Lett., Vol. 36, No. 7, pp. 1065-1067 (2011)

SUMMARY OF INVENTION

Technical Problem

In order to use the above-described medium as a storage device, it is important that a recording quality is ensured. Since the recording quality strongly depends on a power of the laser, highly accurate power control of the laser is necessary for ensuring the quality. However, in any of the related art described above, the manner in which the power of the laser is controlled is not specifically disclosed.

Solution to Problem

Therefore, in the present application, an optical recording device and an optical recording method are configured as described below.

(1) In an optical recording method in which a plurality of recorded dots having refractive indices different from that of surroundings thereof are formed by focusing laser light on an inside of a recording medium, information recording is performed with the power of the laser light being adjusted based on a recorded dot length in a depth direction (depth direction of the medium and irradiation direction of the laser) of the recorded dot.

In this way, it is possible to perform the recording with the recording power adjusted such that the recording quality becomes optimal. As this recommended value of the recording power, a value recorded in the recording medium in advance may be read out and used, or a step of adjusting the recording power before the recording may be provided.

More specifically, the dot length can easily be measured by monitoring the dots from the direction perpendicular to the incident direction of the laser light.

(2) In the optical recording method in which a plurality of recorded dots having refractive indices different from that of surroundings thereof are formed by focusing laser light on an inside of a recording medium, information recording is performed with the power of the laser light being adjusted based on a difference between a focus position where a region of the recorded dots appears brighter than the surroundings and a focus position where the region of the recorded dots appears darker than the surroundings.

In this way, similar to above-described (1), it is possible to adjust the recording power such that the recording quality becomes optimal.

(3) In an optical recording medium, the optimal recording power obtained in above (1) or (2) is recorded in a predetermined region of the medium as a recommended value. In this way, it is possible to acquire the optimal recording power for each medium, and easily perform the information recording.

(4) An optical recording device includes means for measuring the recorded dot length described in above (1) and means for adjusting the power from the result of measurement. In this way, similar to above-described (1), it is possible to provide a device that can perform the optimal recording.

(5) The optical recording device further includes means for measuring the difference described in above (2) between a focus position where a region of the recorded dots appears brighter than the surroundings and a focus position where the region of the recorded dots appears darker than the surroundings and means for adjusting the power from the result of measurement. In this way, similar to above-described (2), it is possible to provide a device that can perform the optimal recording.

Advantageous Effects of Invention

According to the configuration described above, since the power adjustment of the laser light can be optimized, it is possible to ensure a high recording quality.

BRIEF DESCRIPTION OF DRAWINGS

FIG. 4(a) is a diagram illustrating an example of an image of a recording medium in which dots are recorded. FIG. 4 (b) is a diagram illustrating an example of an image of a recording medium monitored by changing a focus position of a camera. FIG. 4(c) is a diagram illustrating an example of the focus position where the dots appear white and the position where the dots appear black.

DESCRIPTION OF EMBODIMENTS

Hereinafter, embodiments of the present invention will be described in detail based on the drawings.
Embodiment 1

In the present embodiment, a method of performing recording by deriving an optimal recording power that enables ensuring a recording quality will be described.

Figure 1:
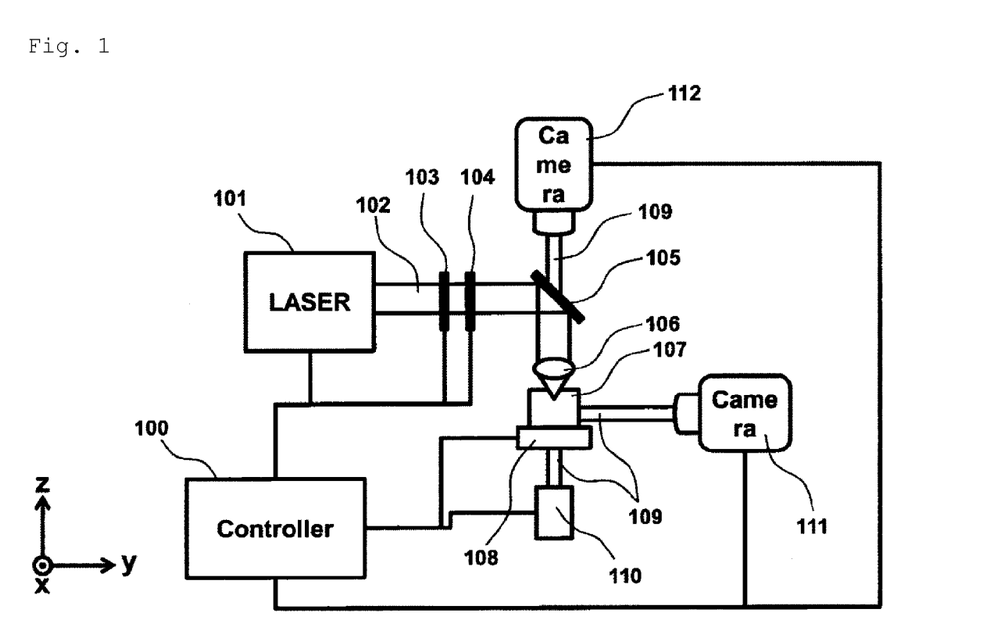
FIG. 1 is a diagram illustrating an example of a device configuration used in a recording method in the present invention.

FIG. 1 is a diagram illustrating an example of a device configuration used in the recording method in the present invention. The device is configured to include a recording optical system, a reproduction optical system, and a controller 100 that controls the entire device. First, the recording optical system will be described. A laser 101 emits laser light 102. An example of the laser 101 includes a short pulse laser that has a high peak power and can induce a nonlinear optical effect such as a titanium sapphire laser, a Q-switched YAG laser, a fiber laser, or the like. A shutter 103 and an attenuator 104 perform control of irradiation and a power of the laser light 102 with respect to a recording medium 107. The shutter 103 and the attenuator 104 may be incorporated in the laser 101, or the same function may be realized by combining a phase modulator and a polarizing plate. A mirror 105 reflects the laser light 102 and transmits reproduction light 109 described below. The laser light 102 is focused on the recording medium 107 by a lens 106, and recording of dots is performed. Here, the recording medium 107 is a medium which is transparent with respect to the laser light 102 such as quartz glass. A stage 108 controls a position of the recording medium 107. By this position control, a focus position of the laser light 102 is changed, and a plurality of dots are three-dimensionally recorded based on record data. As means for changing the focus position of the laser light 102, the recording medium 107 may be moved by the stage 108 using a piezo-motor or a stepping motor, or the focus position may be controlled by a galvanometer mirror or a spatial phase modulator.

Next, the reproduction optical system will be described. A light source for reproduction 110 emits the reproduction light 109. As the light source for reproduction, an LED or a semiconductor laser can be included. The reproduction light 109 is transmitted through the recording medium 107 and focused on the camera 111 and a camera 112. The camera 111 monitors the length of the dot in a depth direction by observing from a direction (y direction) perpendicular to an incident direction of the laser light 102. On the other hand, in the camera 112, it is possible to monitor a brightness of the recorded dot and around the dot by observing from the incident direction (z direction) of the laser light 102. The camera 111 and camera 112 output the monitored image to the controller 100. The controller 100 measures the length of the dot and the brightness of the dot and around the dot from the input image. In addition, the controller 100 calculates an error rate and an SNR (Signal to Noise Ratio) described below and performs signal processing, decoding, and the like and reproduces data based on the measured brightness. Only one of either of the camera 111 and camera 112 may be provided according to the items to be measured such as the length of the dot or the brightness.

Figure 2:
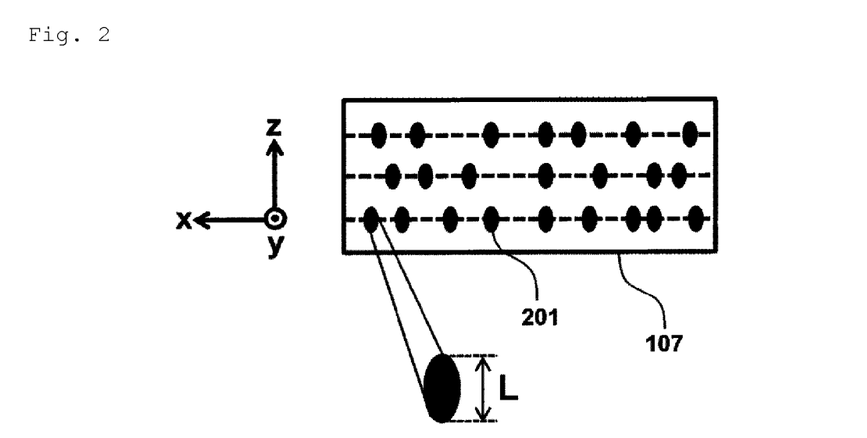
FIG. 2 is a schematic diagram of an image of a recording medium monitored by a camera, in which dots are recorded.
Figure 3:
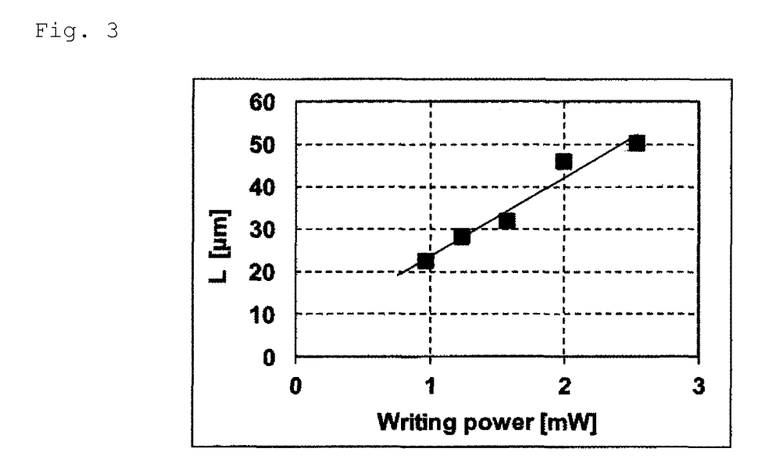
FIG. 3 is a diagram illustrating a relationship between a length L of the dots and recording power.

FIG. 2 is a schematic diagram of an image of the recording medium 107 monitored by the camera 111, in which the dots are recorded. The dots 201 are formed on an xy plane according to the record data, and a plurality of recording layers are virtually formed in the z direction. A diagram on which the relationship between the length L of the monitored dots and the recording power is plotted is FIG. 3. The dot length L correlates with the recording power, and increases with increase in the recording power. This relationship varies according to conditions of the laser 101 and the objective lens 106 and a type of the recording medium. That is, even when the recording power is the same, in a case where the conditions of the objective lens are different from each other, the shape of the formed dots varies. Here, the trend in the dot length L with respect to the recording power is illustrated. However, a similar trend is illustrated when recording energy is used instead of recording power as a parameter. FIG. 4(a) is a diagram illustrating an example of an image of the recording medium 107 monitored by the camera 112, in which the dots are recorded. A region where the laser light 102 is focused can be observed as the dots 201, and it is possible to perform recording and reproduction of the digital data by making the presence and absence of the dots 201 correspond to data of 0 and 1. In addition, as a quality evaluation index, the error rate and the SNR can be calculated as follows. The error rate can be calculated by providing a threshold value of the brightness and determining 0 and 1 for the data, and then, comparing the data with the original data. The SNR can be calculated by an operation of Formula 1 with a difference between the average brightness of the dots and the spaces 202 as a signal amplitude and with a value in which standard deviations of each of brightness of the dots and the spaces are subject to RMS addition as noise.

$$\text{SNR}=20 \log [\sqrt{(\sigma_d^2+\sigma_s^2)}/|V_d-V_s|] \qquad \text{[Formula 1]}$$

Here, $\sigma_d$ and $\sigma_s$ respectively represent the deviation of the brightness of the dots and the spaces, and $V_d$ and $V_s$ respectively represent the average brightness of the dots and the spaces. In addition, the square root sign indicates the operation with respect to $(\sigma_d^2+\sigma_s^2)$, and $|V_d-V_s|$ indicates taking of the absolute value.

In addition, as illustrated in Formula 2, an index in which the difference between the average brightness of the dots 201 and the spaces 202 is normalized using the average brightness of the spaces 202 is a modulation degree M.

$$\text{Modulation degree } M=|V_d-V_s|/V_s \qquad \text{[Formula 2]}$$

Figure 4:
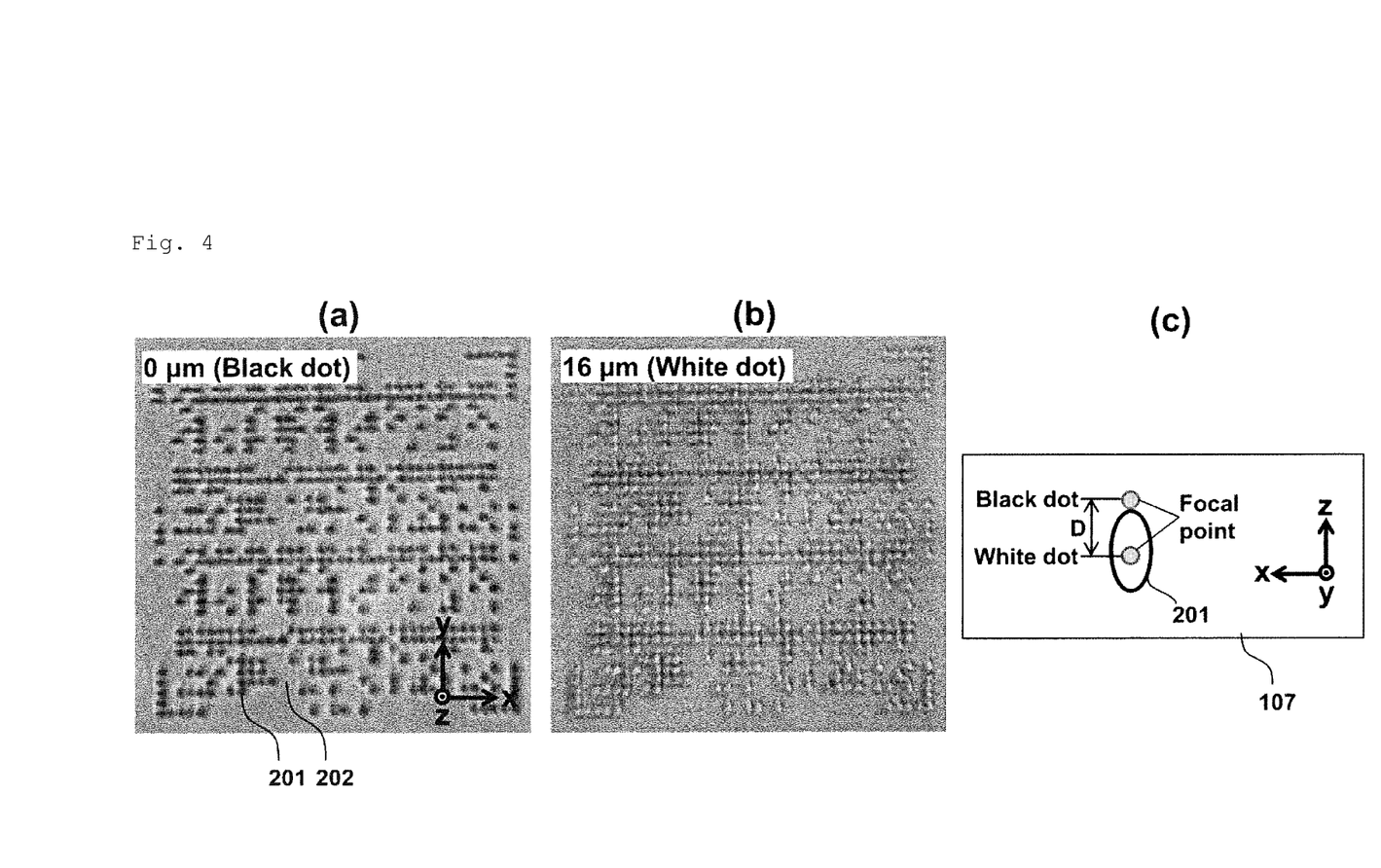
Figure 5:
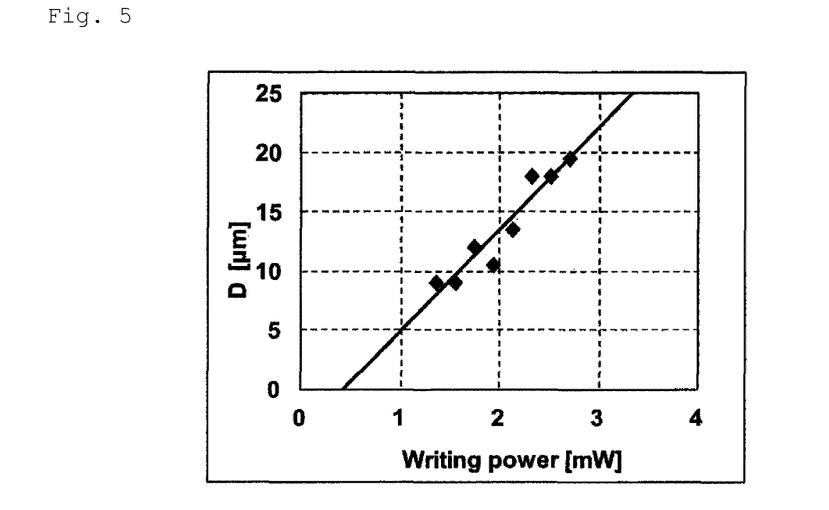
FIG. 5 is a diagram illustrating a relationship between the recording power and a difference D between the focus position where the dots are observed darkest and the position where the dots are observed brightest.

FIG. 4 (b) is a diagram illustrating an example of changing the focus position of the camera 112 by 16 μm in the negative z direction with respect to FIG. 4(a). In FIG. 4(a), the dots are observed as dark (black) with respect to the surroundings, but in FIG. 4(b), the dots are observed as bright (white) with respect to the surroundings. FIG. 4(c) is a diagram illustrating an example of focus positions in FIGS. 4(a) and 4(b). FIG. 5 is a diagram in which the relationship between the recording power and a difference D between the focus position where the dots are observed as darkest and the position where the dots are observed as brightest with respect to the surroundings is plotted. The focus position difference D correlates with the recording power and increases with increase in the recording power. This relationship varies according to the conditions of the laser 101 and the objective lens 106 and a type of the recording medium. That is, the focus position difference D corresponds to the shape and the brightness of the actually formed dots. Here, the trend of the focus position difference D with respect to the recording power is illustrated. However, a similar trend is illustrated when recording energy is used instead of recording power as a parameter.

Figure 6:
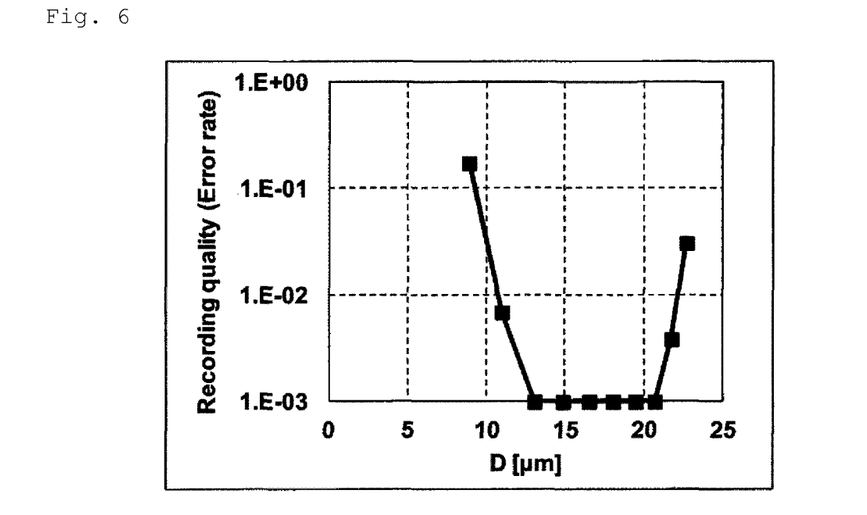
FIG. 6 is a diagram illustrating a relationship between an error rate and a focus position difference D.

FIG. 6 is a diagram illustrating a relationship between the error rate and the focus position difference D. For example, in a case where the target of error rate is equal to or lower than $1\times10^{-3}$, it is preferred that the recording be performed such that the focus position difference D is included in the range of 13 to 20 μm. Here, the example of error rate is illustrated as the index of the recording quality. However, the focus position difference D may be used with respect to another index such as the above-described SNR. In addition, the dot length L or the modulation degree M may be used as a substitute for the focus position difference D. This is because the focus position difference D correlates with the dot length L and the modulation degree M, and thus, a similar trend in the relationship with the recording quality is shown.

Figure 7:
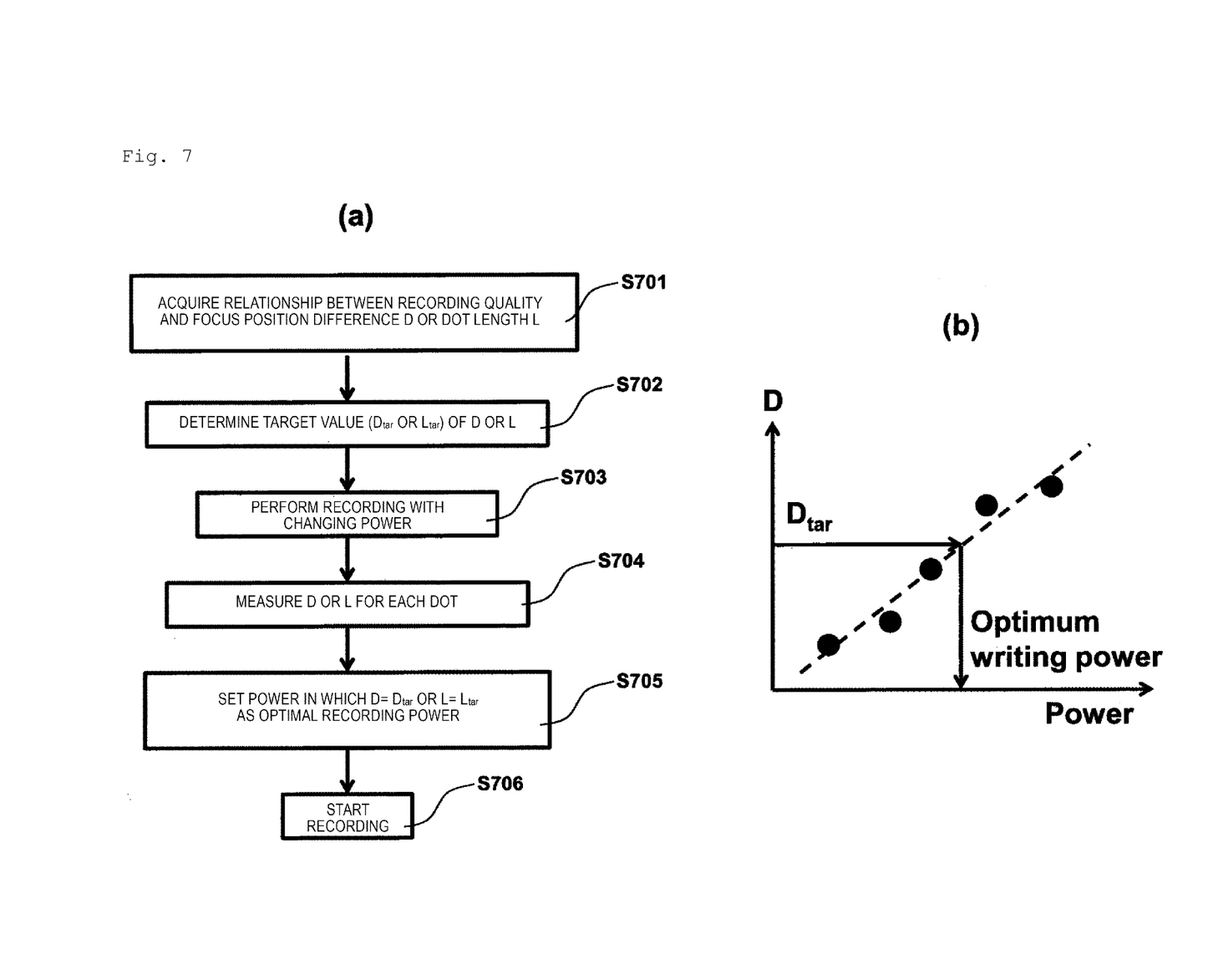
FIG. 7(a) is an example of a flowchart from performing a recording power adjustment according to the present invention to starting of the recording.
FIG. 7(b) is a diagram illustrating a method of performing a recording power adjustment according to the present invention.

FIG. 7(a) is an example of a flowchart from performing a recording power adjustment according to the present invention to the starting of the recording. In S701, the relation between the recording quality and the focus position difference D or the dot length L illustrated in FIG. 6 is acquired. In S702, a target value Dtar of the focus position difference D is determined in accordance with the specification of the recording quality. In the example in FIG. 6, it is preferred that Dtar be 17 which is the center of a margin. In S703, the recording is performed while changing the power, and in S704, the focus position difference D of the dot recorded in S703 is measured. In S706, the recording is started with the power at which D is equal to Dtar in S705 as an optimal recording power. This recording power adjustment is executed in the trial recording region of the recording medium that is different from the user region. Once Dtar is determined, S701 and S702 do not need to be performed when the recording is performed in a similar medium thereafter. Therefore, it is preferred that S701 and S702 be executed before the product shipment of the recording device or when performing the first recording, and Dtar be determined in advance and recorded in the medium. In addition, the dot length L or the modulation degree M may be used as a substitute for the focus position difference D, and the recording energy may be used as the recording condition instead of the recording power. FIG. 7(b) is a diagram illustrating the operations from S703 to S705. The focus position difference D at each recording power is measured, and fitting is performed. By obtaining the focus position difference D which becomes Dtar with respect to the fitting function, the optimal recording power can be derived. The range over which the recording power is changed may be near the power where D is equal to Dtar, or may be the entire range over which the laser can emit. In addition, the number of dots may be one to measure the focus position difference D at each recording power, or a plurality of dots may be recorded and measured in order to improve the measurement accuracy.

As described above, by adjusting the recording power based on the shape of the dots actually recorded on the recording medium, the recording quality can easily be ensured compared to the case where the recording is performed at a fixed recording power set in advance.

In the present embodiment, the description is made using the multilayer structure as in FIG. 2, but the embodiment can also be applied to a single layer. In a case of the single layer also, by performing the processing described above, it is possible to achieve a low error rate and a high SNR.

Embodiment 2

In the present embodiment, an example of a recording power adjustment method in which interlayer crosstalk is suppressed is described. In the present embodiment, the description of configurations and operations which are not different from that in embodiment 1 will not be repeated.

Figure 8:
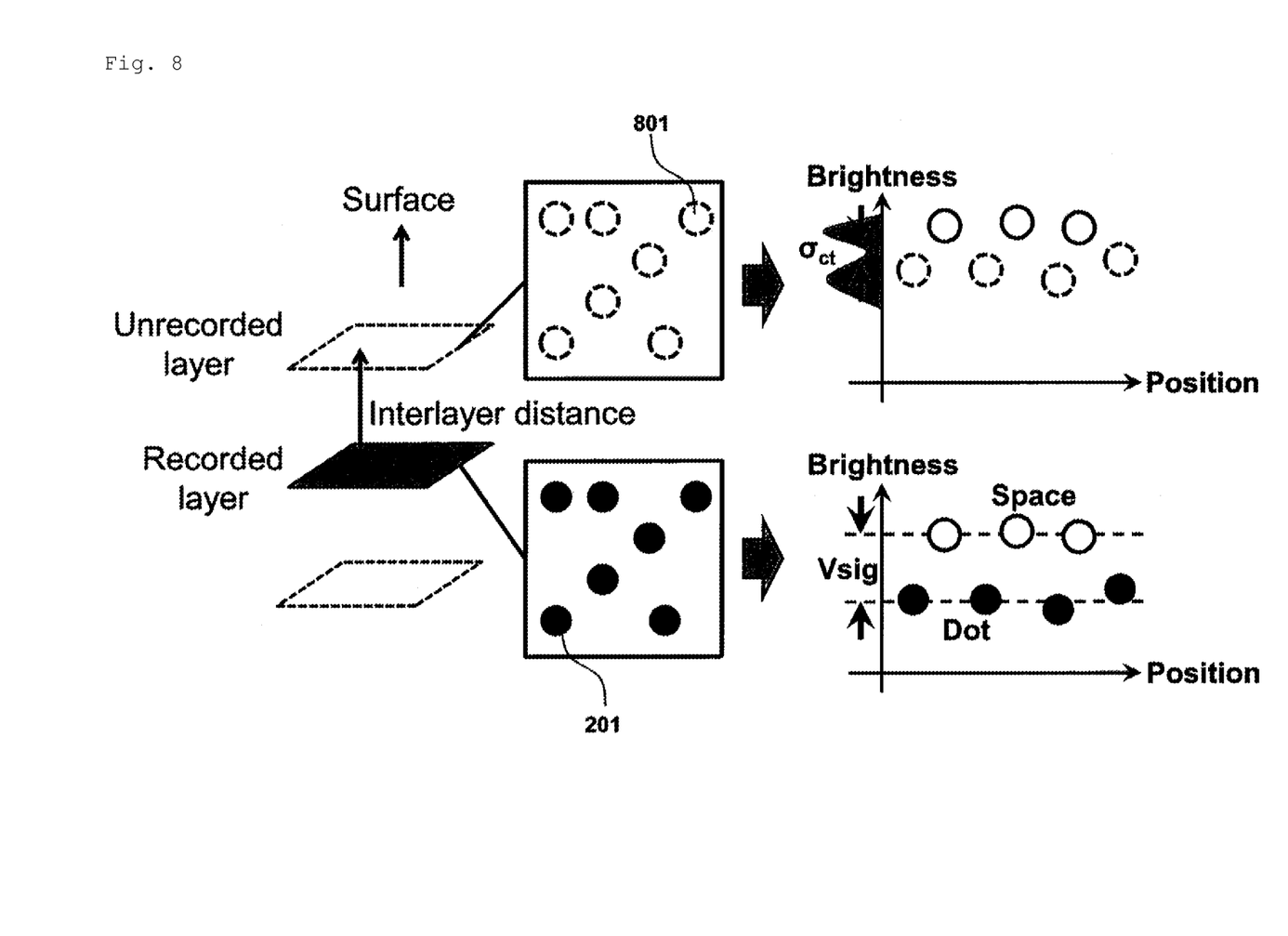
FIG. 8 is a diagram illustrating an example of a quantification method of interlayer crosstalk.

FIG. 8 is a diagram illustrating an example of a quantification method of interlayer crosstalk. In a case where recording is performed on only one layer and the focus position of the camera 112 is changed by as much as a predetermined interlayer distance from the recorded layer and is monitored, an image 801 which is the image of the transmitted dots 201 on the recorded layer is observed. This transmitted image becomes the major factor causing the interlayer crosstalk in the case of multilayer. In order for the interlayer crosstalk to be quantified, it is preferred that the standard deviation σct of the brightness within the predetermined range in an unrecorded layer be acquired. In addition, a value σct/Vsig in which σct is normalized by the signal amplitude Vsig of the recorded layer may be used as the index of the interlayer crosstalk. By normalizing like this, the recording condition dependency of the recorded layer can be cancelled out. In addition, by performing the comparison of the error rate or the SNR in both cases where the recording is performed in only one layer and where the recording is performed in another layer, the difference between the two cases may be used as the index of the interlayer crosstalk.

Figure 9:
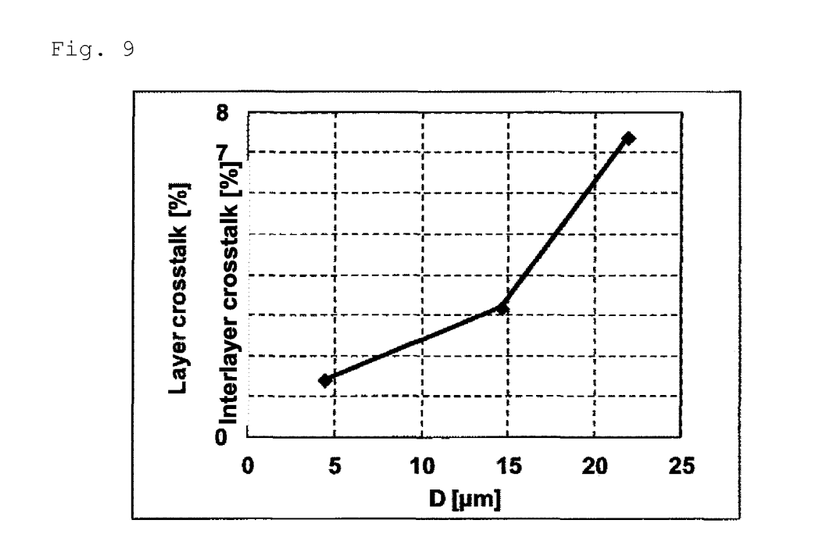
FIG. 9 is a diagram illustrating a relationship between the interlayer crosstalk and the focus position difference D.

FIG. 9 is a diagram illustrating a relationship between the interlayer crosstalk and the focus position difference D described above. The interlayer crosstalk correlates with the focus position difference D, and increases with increase in the recording power. From FIG. 9, in a case where the target interlayer crosstalk is, for example, equal to or lower than 3%, it is preferred that the recording be performed such that the focus position difference D becomes equal to or smaller than 15 μm. That is, it is preferred that the recording power adjustment be executed by setting Dtar to being smaller than 15. Similar to embodiment 1, the dot length L or the modulation degree M may be used as a substitute for the focus position difference D.

Figure 10:
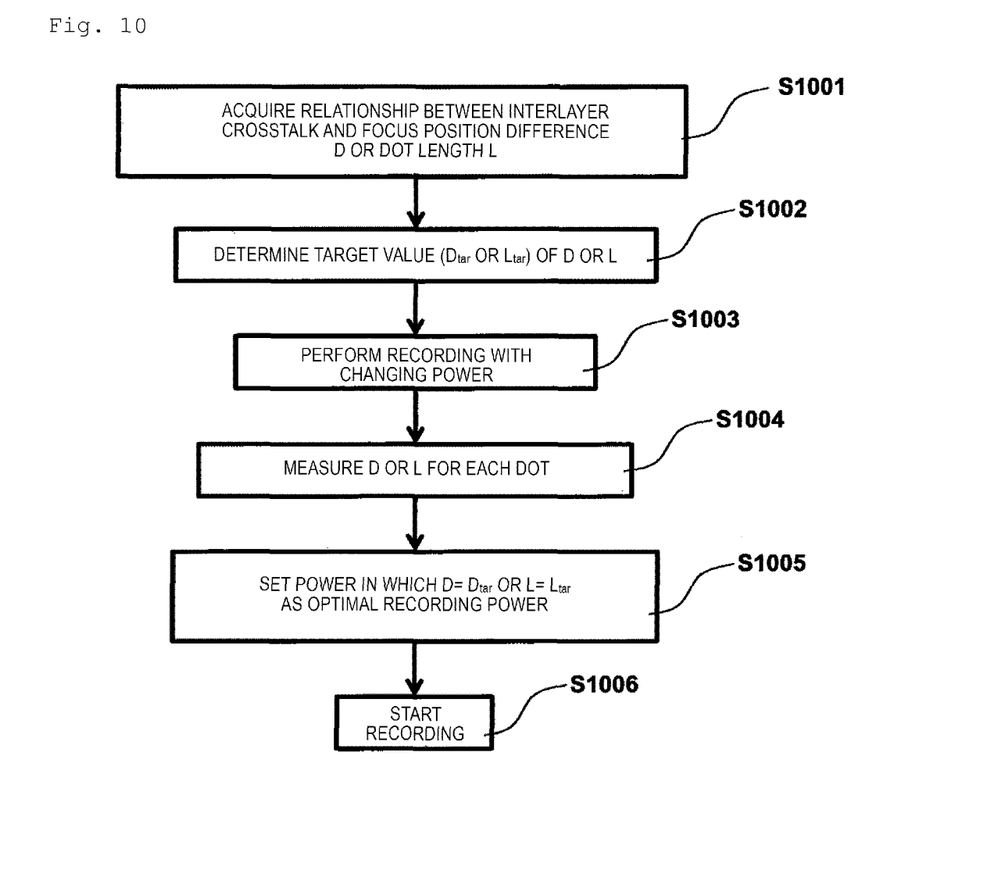
FIG. 10 is an example of a flowchart from performing a recording power adjustment according to the present invention to starting of the recording.

FIG. 10 is an example of a flowchart from performing a recording power adjustment according to the present invention to starting of the recording. In S1001, a relationship between the recording quality and the focus position difference D illustrated in FIG. 9 is acquired. In S1002, the target value Dtar of the focus position difference D is determined in accordance with the specification of the recording quality. In the example in FIG. 9, it is preferred that Dtar be 10, for example. The operation subsequent to S1003 is similar to that subsequent to S703 in FIG. 7 in the Embodiment 1, and the description thereof will not be repeated.

Embodiment 3

In the present embodiment, examples of the recording power adjustment method and interlayer distance determination method for both of ensuring the recording quality and suppressing the interlayer crosstalk are described. In the present embodiment, the description of configurations and operations which are not different from that in embodiment 1 will not be repeated.

Figure 11:
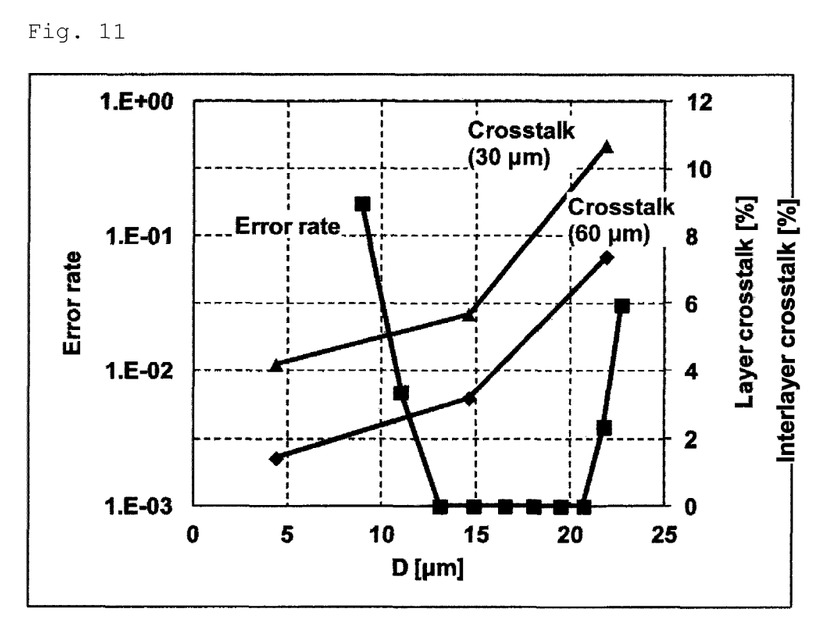
FIG. 11 is a diagram illustrating a relationship between the error rate with respect to the focus position difference D and the interlayer crosstalk.

FIG. 11 is a diagram illustrating a relationship between the focus position difference D and the error rate, and the relationship between the focus position difference D and the interlayer crosstalk in a case where the interlayer distance is 60 μm and 30 μm. The determination method of the target value Dtar of the focus position difference D and interlayer distance in a case where specification of the error rate is equal to or lower than $1 \times 10^{-3}$ and the specification of the interlayer crosstalk is equal to or lower than 6% will be described. In a case where the interlayer distance is, for example, determined to be 30 μm, it is preferred that Dtar be 13 to 15 such that both of the specifications of the error rate and the interlayer crosstalk are satisfied. On the other hand, in a case where the interlayer distance is selectable, for example, it is preferred that the value 17 for D which is the center of the margin of the error rate be Dtar and the interlayer distance be 60 μm. Similar to embodiment 1, the dot length L or the modulation degree M may be used as a substitute for the focus position difference D.

Figure 12:
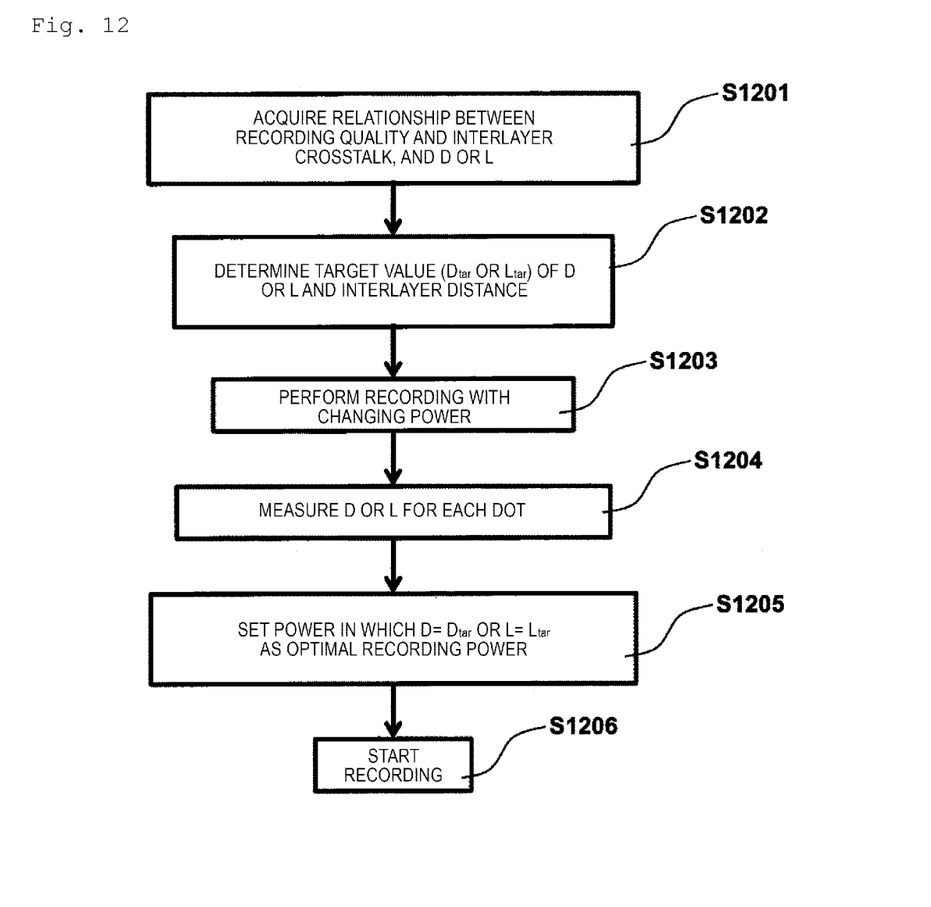
FIG. 12 is an example of a flowchart from performing the recording power adjustment and a determination of an interlayer distance according to the present invention to the starting of the recording.

FIG. 12 is an example of a flowchart from performing the recording power adjustment and a determination of an interlayer distance according to the present invention to starting of the recording. In S1201, a relationship between the recording quality and interlayer crosstalk and the focus position difference D or the dot length L illustrated in FIG. 11 is acquired. In S1202, the focus position difference D and interlayer distance that satisfy both of the specifications of the recording quality and the interlayer crosstalk are determined in accordance with the method described in the explanation of FIG. 11. The operations from S1203 to S1205 are similar to that from S703 to S705 in FIG. 7 in embodiment 1, and the description thereof will not be repeated. In S1206, the recording is performed based on the optimal recording power and the determined specification of the interlayer distance. Similar to the operations in S701 and S702, it is desirable that the operations in S1201 and S1202 be executed before the product shipment, and Dtar and the interlayer distance be determined and recorded in the medium. This is for shortening the required time from the recording instruction by the controller 100 to the time of user data becoming recordable.

Embodiment 4

In the present embodiment, a method of performing recording using a recording medium and the information in which the target value Dtar of the focus position difference D is recorded will be described. In the present embodiment, the description of configurations and operations which are not different from that in embodiment 1 will not be repeated.

Figure 13:
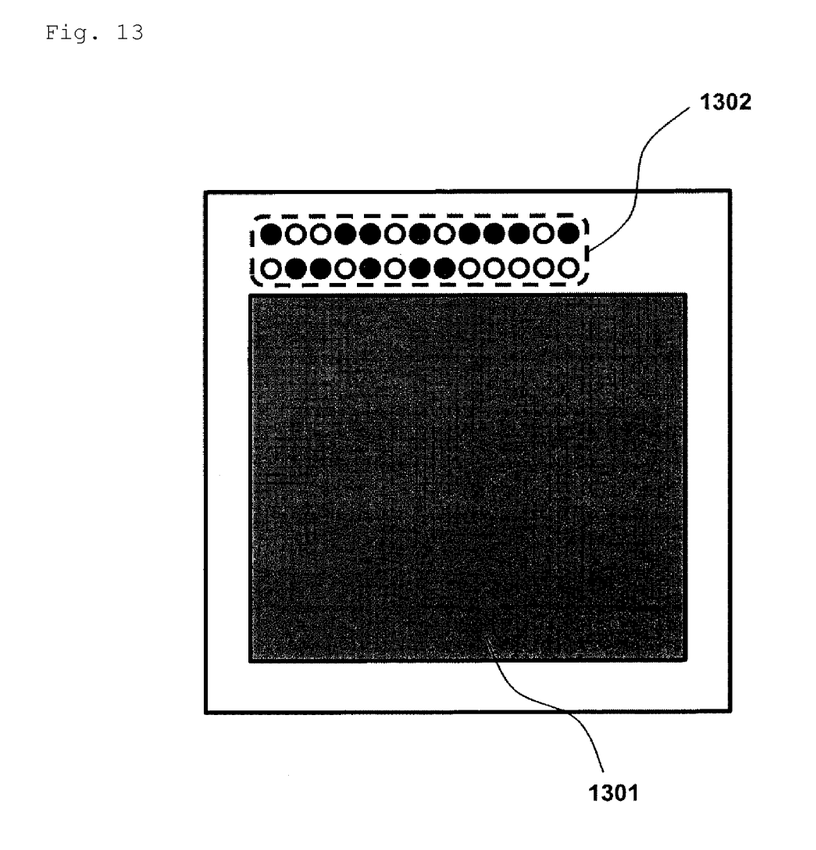
FIG. 13 is a diagram illustrating an example of a recording medium in which a target value of the focus position difference D is recorded.

FIG. 13 is a diagram illustrating an example of a recording medium in which Dtar is recorded. In the medium, a management region 1302 in which Dtar or the specification of the interlayer distance is recorded is provided in a different region from the user data recording region 1301. In this management region, recommended values of Dtar and the interlayer distance may be recorded by the manufacturer of the medium or the specification may be recorded by the device that performs the first recording in the medium. In the management region 1302, besides Dtar, a name of the manufacturer, composition, a date of manufacture, the number of layers, dot spacing, a recommended recording power, and the laser wavelength of the medium may be recorded, and a target value Ltar of the dot length L or a target value Mtar of the modulation degree M may be recorded as a substitute for Dtar. The example of providing the management region 1302 outside of the recording region 1301 is described here. However, the management region 1302 may be provided at a specific position such as a head in the recording region 1301. In addition, a management region 1302 may be provided for each recorded layer or for each recording block unit. This is effective in a case where the recording characteristics are different depending on regions in the recording medium.

Figure 14:
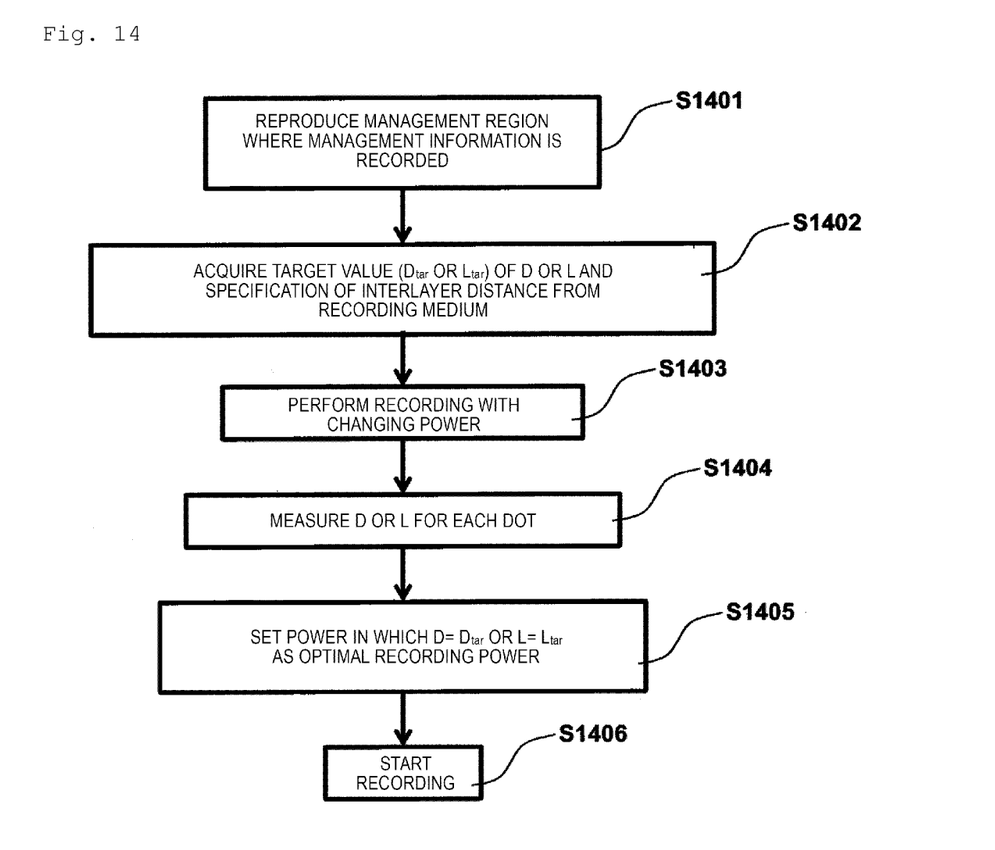
FIG. 14 is an example of a flowchart of performing a recording with reference to information recorded in the recording medium.

FIG. 14 is an example of a flowchart of performing the recording with reference to the information recorded in the recording medium illustrated in FIG. 13. In S1401, the reproduction of the management information recorded in the management region 1302 is performed. In S1402, Dtar or the specification of the interlayer distance is acquired from the management information. The operations subsequent to S1403 are similar to that subsequent to S1203 in FIG. 12 in the Embodiment 3 and the description thereof will not be repeated.

In the present embodiment, the recording medium in which the target value Dtar of the focus position difference D is recorded is described. However, the adjusted optimal recording power may be recorded in the management region. In this case, although it is not possible to easily cope with the variations of the device, the step for performing the power adjustment can be omitted. Therefore, effective information recording can be performed using simple steps.

In each of the above-described embodiments, determining any of the target value of the recorded dot length L or the focus position difference D, and then measuring L or D for each recorded dot is described. However, the target value of L and D may be determined and L and D may be measured for each recorded dot. In this case, since the recording power can be determined while satisfying both of the parameters, this is effective for obtaining a higher recording quality.

REFERENCE SIGNS LIST

100: controller
101: laser
102: laser light
103: shutter
104: attenuator
105: mirror
106: lens
107: recording medium
108: stage
109: reproduction light
110: light source for reproduction 111: camera
112: camera
201: dot
202: space
801: transmitted dot
1301: user data recording region
1302: management region

The invention claimed is:

1. An optical recording method in which, by focusing laser light on an inside of an optical recording medium, a plurality of recorded dots having refractive indices different from that of surroundings thereof are formed, the method comprising:
   a step of acquiring a power value of the laser light adjusted based on a recorded dot length in a depth direction of the recorded dots and/or a difference between a focus position where a region of the recorded dots appears brighter than the surroundings and a focus position where the region of the same recorded dots appears darker than the surroundings,
   wherein information recording is performed by the acquired power value.

2. The optical recording method according to claim 1,
   wherein the power value of the laser light is recorded in a predetermined region of the optical recording medium, and
   wherein the acquiring step is performed by reading out the recorded power value.

3. The optical recording method according to claim 1,
   wherein, in the step of acquiring the power value of the laser light, the power value of the laser light is acquired by a step of measuring the recorded dot length and/or the difference and a step of adjusting the power value of the laser light based on the measurement result.

4. The optical recording method according to claim 1,
   wherein the adjustment is performed by
   a step of acquiring a relationship between an index for evaluating a recording quality and the recorded dot length and/or the difference,
   a step of determining a target value of the recorded dot length and/or the difference such that a predetermined condition of the index evaluating the recording quality is satisfied, and
   determining the power of the laser light that meets the target value by changing and recording the power of the laser light.

5. The optical recording method according to claim 1,
   wherein the optical recording medium includes a plurality of recorded layers, and
   wherein the adjustment is performed by
   a step of acquiring a relationship between an amount of interlayer crosstalk and the recorded dot length and/or the difference,
   a step of determining a target value of the recorded dot length and/or the difference such that a predetermined condition of the amount of interlayer crosstalk is satisfied, and
   determining the power of the laser light that meets the target value by changing and recording the power of the laser light.

6. The optical recording method according to claim 1,
   wherein the optical recording medium includes a plurality of recorded layers, and
   wherein the adjustment is performed by
   a step of acquiring a relationship between the index evaluating the recording quality and the amount of interlayer crosstalk and the recorded dot length and/or the difference,
   a step of determining a target value of the recorded dot length and/or the difference such that the predetermined condition of the amount of interlayer crosstalk is satisfied, and
   determining the power of the laser light that meets the target value by changing and recording the power of the laser light.

7. The optical recording method according to claim 6,
   wherein an interlayer distance of the plurality of recorded layers is adjusted such that the predetermined condition of the amount of interlayer crosstalk is satisfied.

8. The optical recording method according to claim 5,
   wherein the amount of interlayer crosstalk is any one of a variation σct of the brightness in a non-recorded layer separated from the recorded layer by a predetermined interlayer distance, a value σct/Vsig in which the σct is normalized by the signal amplitude Vsig of the recorded layer, and a difference between the recording quality at the time of single layer recording and the recording quality at the time of plural layer recording.

9. The optical recording method according to claim 4,
   wherein the determined target value is recorded on a predetermined region in the optical recording medium, and
   wherein the power of the laser light that meets the target value is determined by reading out the target value.

10. An optical recording medium in which, by irradiation of light, a plurality of recorded dots having refractive indices different from that of surroundings thereof are formed, the optical recording medium comprising:
    a user data region in which user data is recorded by the recorded dots; and
    a management region in which a recommended value of a recorded dot length in a depth direction of the recorded dot and/or a recommended value of a difference between a focus position where a region of the recorded dots appears brighter than the surroundings and a focus position where the region of the same recorded dots appears darker than the surroundings are recorded.

11. The optical recording medium according to claim 10,
    wherein the interlayer distance of the recorded layers is also recorded in the management region.

12. An optical recording device comprising:
    a light source that emits laser light;
    means for recording a plurality of recorded dots having refractive indices different from that of surroundings thereof by focusing the laser light on an optical information recording medium;
    means for monitoring a brightness of the recorded dots and a surrounding region; and
    means for acquiring a difference between a focus position where the recorded dots appear brighter than the surroundings and a focus position where the same recorded dots appear darker than the surroundings by the means for monitoring, and adjusting a power of the laser light based on the difference.

* * * * *